(12) United States Patent
Hason (10) Patent No.: US 10,382,474 B2
(45) Date of Patent: Aug. 13, 2019

(54) CYBER DEFENSE

(71) Applicant: CyberGym Control, Ltd., Holon (IL)

(72) Inventor: Ofir Hason, Bat Hefer (IL)

(73) Assignee: CYBERG CONTROL LTD., Holon (IL)

( * ) Notice: Subject to any disclaimer, the term of this patent is extended or adjusted under 35 U.S.C. 154(b) by 0 days.

(21) Appl. No.: 15/033,875

(22) PCT Filed: Oct. 30, 2014

(86) PCT No.: PCT/IB2014/065710
§ 371 (c)(1),
(2) Date: May 2, 2016

(87) PCT Pub. No.: WO2015/063715
PCT Pub. Date: May 7, 2015

(65) Prior Publication Data
US 2016/0301710 A1 Oct. 13, 2016

Related U.S. Application Data

(60) Provisional application No. 61/898,487, filed on Nov. 1, 2013.

(51) Int. Cl.
| | |
|---|---|
| *H04L 29/06* | (2006.01) |
| *G06F 21/56* | (2013.01) |
| *G06F 21/57* | (2013.01) |
| *H04L 29/08* | (2006.01) |

(52) U.S. Cl.
CPC ........ *H04L 63/1441* (2013.01); *G06F 21/566* (2013.01); *G06F 21/577* (2013.01);
(Continued)

(58) Field of Classification Search
CPC ............. H04L 63/1441; H04L 63/1433; H04L 63/145; H04L 63/1458; H04L 67/12; H04L 67/22; G06F 21/566; G06F 21/577
See application file for complete search history.

(56) References Cited

U.S. PATENT DOCUMENTS

| | | |
|---|---|---|
| 6,088,804 A | 7/2000 | Hill et al. |
| 8,601,587 B1 | 12/2013 | Powell et al. |

(Continued)

OTHER PUBLICATIONS

Sep. 16, 2015 International Search Report and Written Opinion issued in International Application No. PCT/IB2014/065710.
(Continued)

*Primary Examiner* — Brandon S Hoffman
*Assistant Examiner* — Thong P Truong
(74) *Attorney, Agent, or Firm* — Kenealy Vaidya LLP (57) ABSTRACT

Some embodiments are directed to a simulation facility that includes an operational physical model facility of a real infrastructure facility that mimics at least in part operations of the real infrastructure facility and comprises equipment that corresponds to and mimics operations of equipment in the real infrastructure facility; attack toolware for use by people in mounting cyber attacks on the model facility; operations and management toolware for use by people in operating and defending the model facility against cyber attacks mounted using the attack toolware; and a controller having a memory and operable to acquire and store in the memory a forensic record of cyber attacks mounted on the model facility and defense strategies undertaken to defend the model facility against the cyber attacks.

20 Claims, 2 Drawing Sheets

(52) U.S. Cl.
CPC ........ *H04L 63/145* (2013.01); *H04L 63/1433* (2013.01); *H04L 63/1458* (2013.01); *H04L 67/12* (2013.01); *H04L 67/22* (2013.01); *Y04S 40/18* (2018.05)

(56) References Cited

U.S. PATENT DOCUMENTS

| | | | |
|---|---|---|---|
| 9,325,728 B1* | 4/2016 | Kennedy | H04L 63/1433 |
| 2005/0004823 A1* | 1/2005 | Hnatio | G06Q 10/10 706/62 |
| 2007/0226796 A1 | 9/2007 | Gilbert et al. | |
| 2010/0033333 A1* | 2/2010 | Victor | A61B 3/113 340/576 |
| 2010/0138925 A1 | 6/2010 | Barai et al. | |
| 2010/0319069 A1 | 12/2010 | Granstedt et al. | |
| 2011/0185432 A1 | 7/2011 | Sandoval et al. | |
| 2011/0264608 A1 | 10/2011 | Gonsalves et al. | |
| 2013/0198847 A1* | 8/2013 | Sampigethaya | H04L 63/1433 726/25 |

OTHER PUBLICATIONS

International Preliminary Report on Patentability for PCT/IB2014/065710 dated Apr. 22, 2016.
Ixia Blog Team, "Red Team, Blue Team: A Better Approach to Cyber Security Training", Jun. 29, 2011, www.ixiacom.com/company/blog/red-team-blue-team-better-approach-cyber-s . . . Sep. 25, 2018.
Junichi Rekimoto, "WiFi location recognition technology and application to location aware computing", Journal of Human Interface Society, Feb. 25, 2008, vol. 10, No. 1, p. 21-26, ISSN 1344-7254.

* cited by examiner

CYBER DEFENSE

CROSS REFERENCE TO RELATED APPLICATION

This application is a National Phase filing under 35 C.F.R. § 371 of and claims priority to International Application No.: PCT/IB2014/065710, filed on Oct. 30, 2014, which claims the benefit under 35 U.S.C. § 119(e) of U.S. Provisional Application No. 61/898,487 filed on Nov. 1, 2013, the contents of which are hereby incorporated in their entireties by reference.

TECHNICAL FIELD

Embodiments of the invention relate to methods of protecting infrastructure installations against cyber attacks.

BACKGROUND

Modern infrastructure installations, such as power stations, water treatment plants, oil and gas pipeline distribution systems, hereinafter generically referred to as infrastructure facilities, are complex facilities that produce, control, and/or distribute large quantities of resources essential for proper functioning of modern society. Each infrastructure facility embodies a complicated environment typically comprising a web of human operators and an integrated system of automated equipment, monitoring systems, and a network of computers that cooperate to control the equipment responsive to data provided by the monitoring systems and the human operators. The computers, monitoring systems, equipment and operators communicate via a communication network that may comprise both wire and wireless communication devices. The computers and instruction sets they execute and information systems they access, the monitoring systems, and the communication network are conventionally referred to as a supervisory control and data acquisition (SCADA) system. SCADA is accessed by the human operators via human machine interface (HMI) equipment, such as consoles, keyboards, and voice recognition control equipment.

A single given infrastructure facility may provide services and resources to a population in a facility service area that may have a relatively limited geographical extent, such as that of a small town or portion of a town, or to a population in a relatively extended geographical region, such as that of a large city, group of cities, or a state. Generally, infrastructure facilities are integrated to cooperate and provide services and resources to populations in very large geographical regions that extend beyond the service area of a single one of the cooperating infrastructure facilities.

For example, whereas a single power station may provide power to a neighborhood wide or citywide population, a plurality of power stations may be integrated to form a power grid that provides power to a population in a region of a country comprising a state, or more than one state in the country. And a plurality of power stations may be integrated to provide a power grid of interdependent power stations that provides power to a country or to a geographical region that extends beyond the borders of single country. For example, a power grid referred to as the Quebec Interconnection provides power to the Canadian province of Quebec and the U.S. Northeast. The Western Interconnection and the Eastern Interconnection power grids provide power respectively to the US western states and the US southeastern states. The Indian Power system is divided into five large regional grids. One large power grid provides power for most of continental Europe.

The various power stations and power grids concentrate, use, and control physical and economic assets of enormous value, and disruptions and/or damage to their functioning or the assets can cause substantial economic damage to national and global economies, cause physical damage, and even lead to loss of life. For example, a loss of power referred to as the 2003 blackout left about fifty five million people in northeastern Canada and the US without power for about four hours. The "short" four hour blackout is estimated to have cost about six billion dollars.

The blackout was caused by a software bug in an alarm system at the FirstEnergy Corporation of Ohio. The bug prevented an alarm being raised to alert operators to redistribute transmission line power after overloaded transmission lines in a rural area sagged and hit trees causing a flashover that took the sagging lines out of service. The out of service lines led to a cascade failure in which other transmission lines successively overloaded, quickly dropped out of service, and generated the blackout.

Whereas the 2003 blackout was unintentional, power facilities, such as power stations and power grids, are exposed to intentional damage from cyber attacks of various degrees of sophistication and severity. Cyber attacks attempt to inflict damage on power facilities by exploiting vulnerabilities of the SCADA systems that control the facilities to various types of attacks that may damage their operation. Cyber attacks may be directed to compromising computer instruction sets, execution of the instruction sets, data processed by execution of the instruction sets, and/or how the computers communicate between themselves, with equipment they control, and/or the outside world. Examples of cyber attacks include: denial of service; submission of false request from or false information to operating personnel; input of spurious data to data bases and/or equipment; unauthorized operation of facility equipment; disruption of communications; and instruction set corruption by malware such the stuxnet computer worm.

To protect the facilities, operators implement various security procedures and install various technologies designed to prevent and/or mitigate consequences of a cyber attack. However, the complexity of the facilities and the technological and financial resources often readily available to individuals, organizations, and nation states for crafting a cyber attack allow myriad possible scenarios for cyber attacks of different forms and perniciousness. As a result, configuring appropriate protection for a power facility is a difficult task that typically requires addressing a large profile of security issues and generally requires repeated review. Whereas the security procedures and technologies deployed appear to be relatively effective in addressing a constant, background tattoo of relatively low level, small scale cyber attacks to which the facilities are regularly exposed, it is difficult, if not impossible, for example to predict their efficacy against high impact low frequency (HILF), "black swan", cyber events.

SUMMARY

An aspect of an embodiment of the invention relates to providing a method of developing software and hardware technologies, protocols and systems, hereinafter referred to generically as "cyber shield" technologies, for preventing and/or mitigating consequences of cyber attacks on a infrastructure facility. In an embodiment of the invention the infrastructure facility comprises a power facility. Optionally, the method facilitates improving anticipation of cyber attacks.

An aspect of an embodiment of the invention relates to providing a simulation facility comprising an operational model of the power facility that mimics operations of the "real" power facility, in which and with which simulation facility people interact to generate cyber shield technologies. The operational model, which may be referred to as a model facility, comprises real and/or virtual equipment that correspond to and operate similarly to equipment in the real power facility.

An aspect of an embodiment of the invention relates to configuring an "interaction format" in accordance with which people interact in and with the simulation facility.

In an interaction format in an embodiment of the invention, first and second teams of people are provided with access to the simulation facility to generate cyber shield technologies. The first team of people, hereinafter also referred to as "simulation attack agents", is instructed to attempt to mount cyber attacks on the model facility to disrupt operations of the model facility. The second group of people, hereinafter also referred to as "simulation defense agents", is instructed to defend the model facility against cyber attacks and maintain normal operation of the model facility.

An aspect of an embodiment of the invention relates to monitoring activities of the simulation attack and defense agents in competing against each other and implementing and/or creating cyber strategies to respectively disrupt and thwart disruption of functioning of the model facility to acquire a forensic record of the activities. The forensic record may be processed as discussed below to provide cyber shield technologies for the model facility and the real facility.

The forensic record may include a chronological history of actions undertaken by the simulation attack agents in mounting attacks on the model facility and defensive measures undertaken by defense agents in defending the model facility against the attacks and results of the attacks and defensive measures. Monitoring activity of the simulation attack and defense agents may include monitoring HMI activity of the agents. Monitoring HMI activity optionally includes keystroke logging to follow simulation agents' use of keyboards to mount a cyber attack and/or engage and use a defensive computer instruction set to protect against the cyber attack. Monitoring HMI activity may comprise monitoring interaction of a simulation agent with a computer video display, optionally by employing eye tracking technology to track the agent's gaze direction and determine the simulation agent's points of regard (POR) and movement of the POR between features of the display. Optionally, monitoring activity of simulation agents comprises monitoring physiological features of the agents to provide indications for example of levels of concern, stress, and/or alertness.

An aspect of an embodiment of the invention relates to processing data in the forensic record to provide cyber attack recognition, alert, and response systems and/or protocols for use in protecting the model facility against cyber attacks mounted by the simulation attack agents, and optionally, to protect the real power facility against cyber attacks mounted by real attack agents. Providing the systems and/or protocols optionally comprises processing the forensic data to generate a database, hereinafter also referred to as a cyber attack and defense database (CYBAD database) comprising data that identifies and characterizes cyber attacks and cyber defenses.

In an embodiment of the invention cyber attacks are identified and characterized in CYBAD by feature vectors. Components of a cyber attack feature vector optionally encode values for parameters that measure performance of real and virtual equipment in the model power facility that correspond to equipment in the real power facility. Optionally, the feature vector components include by way of example, values for transmission delay and/or packet loss measurements for data transmitted between a particular list of nodes in the SCADA system of the power plant, temperatures of a set of turbines, and/or times of last setting of circuit breaker overcurrent ratings. Optionally, a cyber attack feature vector encodes an attack tree that characterizes the cyber attack.

In an embodiment of the invention, at least one status feature vector is defined for the model facility and optionally the real power facility. The at least one status feature vector comprises components that may be used to recognize and indicate a probability of the model or real facility being subject to a cyber attack and is repeatedly reevaluated. Optionally, recognition of a probability of attack at a given time is determined responsive to a scalar product of the status vector at the given time and a feature vector comprised in the CYBAD database.

In an embodiment of the invention, defense strategies for preventing and/or minimizing effects of cyber attacks are identified and characterized in the CYBAD database by "defense feature vectors". A countermeasure to a given cyber attack may be determined responsive to a value of a scalar product of the cyber attack feature vector and a defense feature vector.

In an embodiment of the invention the systems and/or protocols are configured and executed by neural networks that are trained on data comprised in the CYBAD database.

There is therefore provided in accordance with an embodiment of the invention a cyber simulation facility comprising: an operational physical model facility of a real infrastructure facility that mimics at least in part operations of the real infrastructure facility and comprises equipment that corresponds to and mimics operations of equipment in the real infrastructure facility; attack toolware for use by people in mounting cyber attacks on the model facility; operations and management toolware for use by people in operating and defending the model facility against cyber attacks mounted using the attack toolware; and a controller having a memory and operable to acquire and store in the memory a forensic record of cyber attacks mounted on the model facility and defense strategies undertaken to defend the model facility against the cyber attacks.

Optionally, the equipment in the model facility comprises physical equipment. Alternatively or additionally the equipment in the model facility may comprise virtual equipment.

In an embodiment of the invention the cyber simulation facility comprises collector agents that acquire operations status data relevant to, or indicative of the functioning of the equipment in the model facility. Optionally, the controller receives the operations status data and stores the operations status data in the memory as part of the forensic record. The cyber simulation facility optionally comprises a model maker module that processes data in the forensic record to generate operations status vectors comprising components that have values responsive to operations status data provided by each of a plurality of the collector agents.

In an embodiment of the invention the cyber simulation facility comprises human activity sensors that acquire data indicative of activity of people that use the attack toolware to mount cyber attacks on the model facility or use the operations and management toolware to operate and defend the model facility against the cyber attacks. Optionally, the controller receives the data acquired by the human activity sensors and stores the received data in the memory as part of the forensic record. In an embodiment of the invention the cyber simulation facility comprises a model maker module that processes data in the forensic record to generate operations status vectors having components that have values responsive to data provided by each of a plurality of the human activity sensors.

In an embodiment of the invention, the model maker module defines at least one classifier responsive to the operations status vectors for determining whether an operations status vector at a given time indicates that the model facility is under a cyber attack. Optionally, the at least one classifier comprises a support vector classifier. Alternatively or additionally the at least one classifier comprises a neural network.

There is further provided in accordance with an embodiment of the invention, a real infrastructure facility configured to use the forensic record provided by a cyber simulation facility in accordance with an embodiment of the invention to defend the real infrastructure against cyber attack.

There is further provided in accordance with an embodiment of the invention a real infrastructure facility configured to use a classifier in accordance with an embodiment of the invention to determine if the real facility is under a cyber attack.

In an embodiment of the invention the real infrastructure facility comprises a power station.

There is further provided in accordance with an embodiment of the invention a method of developing a strategy to defend an infrastructure facility against cyber attack, the method comprising: acquiring a forensic record provided by a cyber simulation facility in accordance with an embodiment of the invention responsive to people using toolware in the cyber simulation facility to mount and defend against cyber attacks on a model infrastructure facility of the cyber simulation facility; and processing data in the forensic record to generate a defense strategy to defend the infrastructure facility against cyber attacks.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
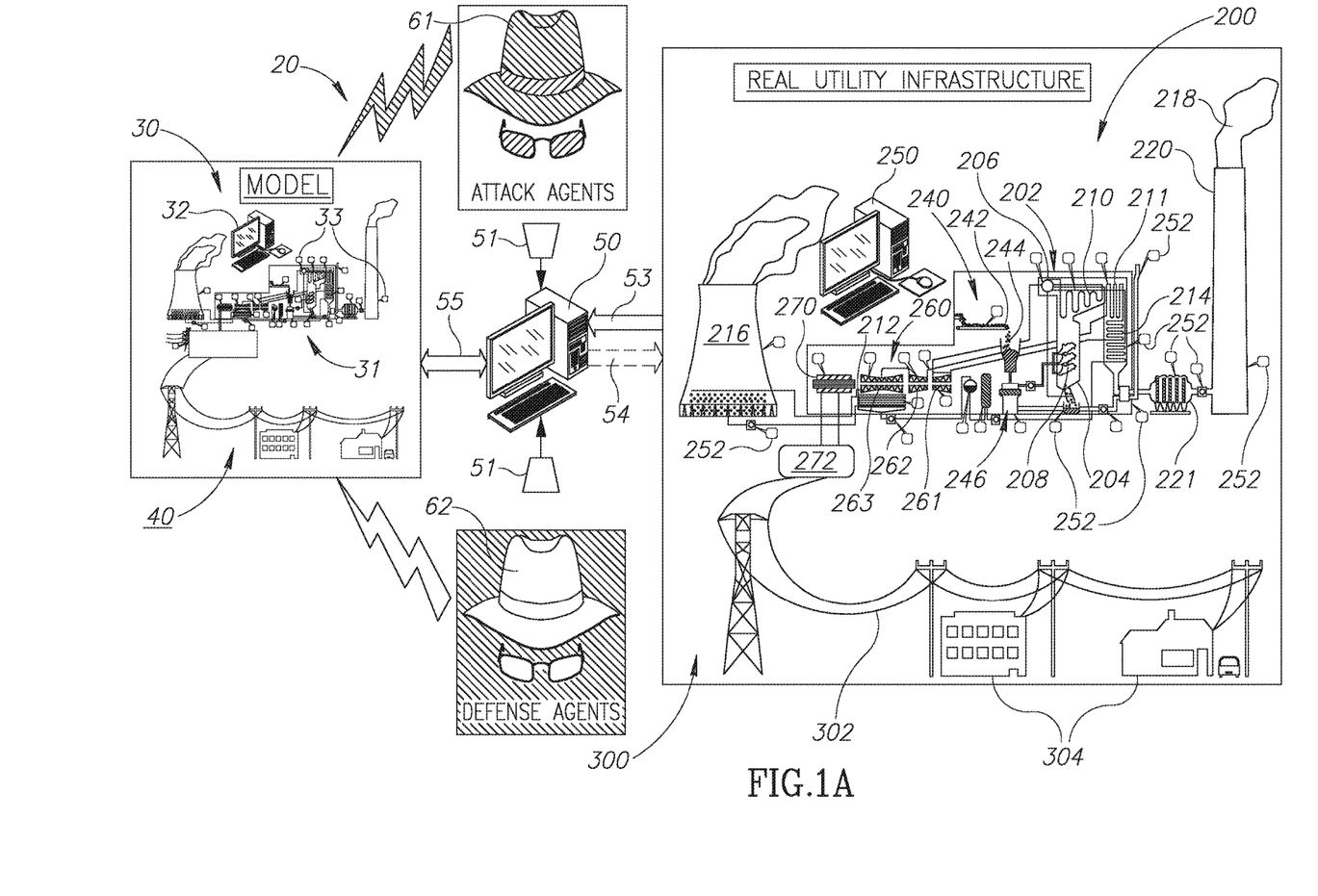
FIG. 1A schematically shows an infrastructure facility that comprises a power station and power distribution grid and a simulation facility corresponding to the power station and grid, in accordance with an embodiment of the invention.
Figure 1B:
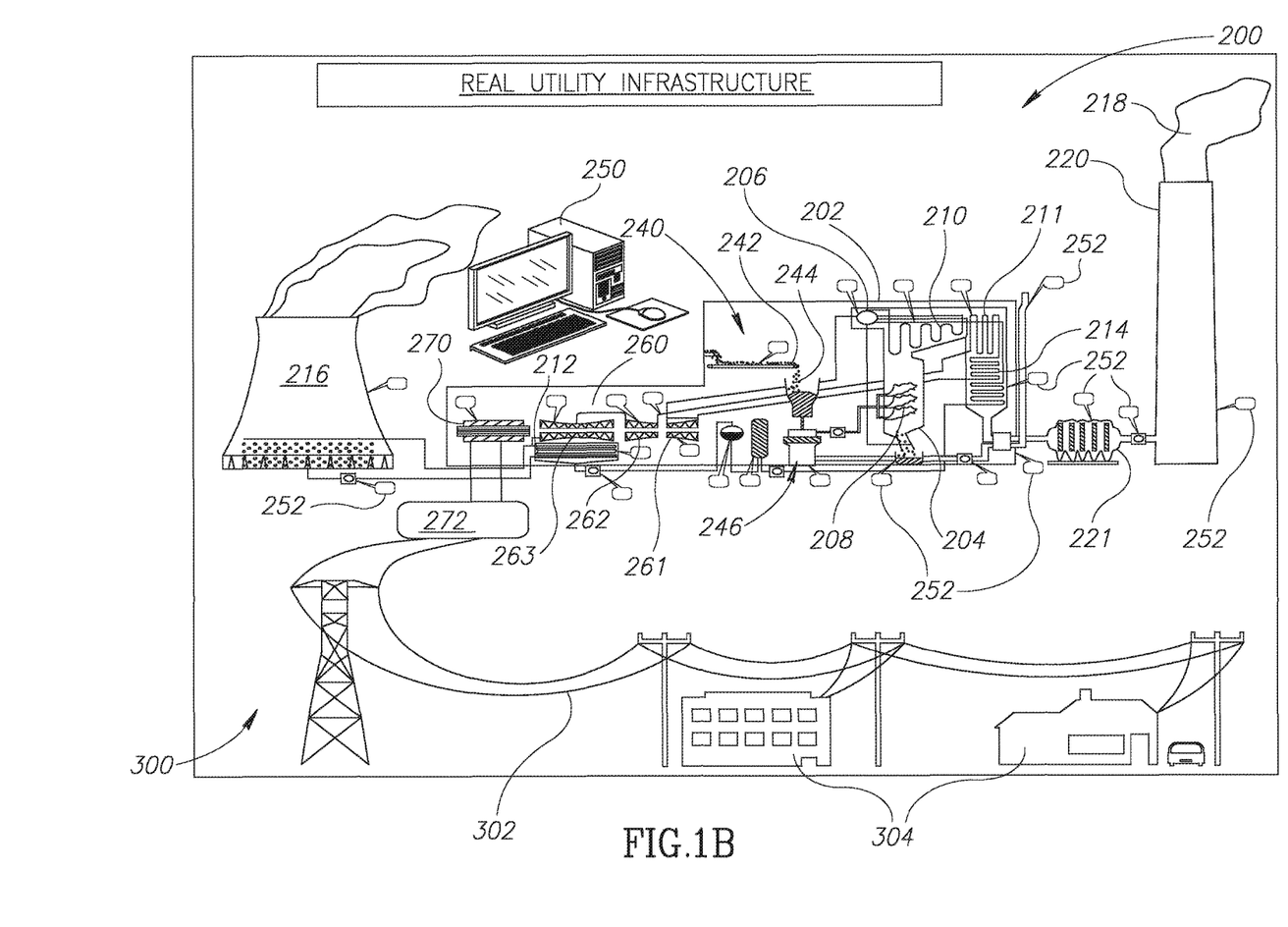
FIG. 1B schematically shows an enlarged image of the power station and distribution grid shown in FIG. 1A.

FIG. 1A schematically shows a real power facility 200 and a simulation facility 20 comprising a model facility 22 that models the real facility, in accordance with an embodiment of the invention. By way of example, power facility 200 comprises a power station 200 connected to a portion of a power grid 300 comprising electric transmission cables 302 to deliver electric power to industrial and domestic customers 304. Power station 200 by way of example is assumed to be a coal burning power station that comprises a complex configuration of power production and control equipment schematically shown, or represented by icons, in FIG. 1A. Components of a steam power station are well known and only some of the equipment that a coal burning power station may comprise is shown in the figure and only some of the shown equipment is explicitly discussed. FIG. 1B schematically shows an enlarged image of power station 200 in which structural details of power station are more clearly seen.

Power station 200 comprises a steam generating complex 202 that burns coal delivered by a coal feed system 240 in a furnace 204 to generate steam for driving a turbine system 260. Turbine system 260 rotates an electromechanical generator 270 to produce electric power. Electric power at an output voltage of electromechanical generator 270 is transmitted to a step up transformer 272 that raises the voltage of the power to a suitable high voltage for transmission to customers 304 via distribution grid 300. Step down transformers (not shown) convert the high voltage electric power transmitted via transmission cables 302 to power at a voltage suitable for use by domestic and industrial customers 304.

Coal feed system 240 may comprise a coal conveyer 242 that conveys coal 244 to a pulverizer 246 that produces and delivers a mixture of pulverized coal and air to furnace 204 where the mixture is burned to produce heat for turning water held in a boiler drum 206 to steam. Burning of the coal and air mixture in furnace 204 is schematically represented by "flames" 208. The steam generated in boiler drum 206 is circulated to turbine system 260 from steam generating complex 202 via heat exchange coils conventionally referred to as "super heater" and "reheater", labeled by numerals 210 and 211 in FIG. 1A.

Turbine system 260 generally comprises a high pressure turbine 261, a medium pressure turbine 262, and a low pressure turbine 263. Steam to drive high pressure turbine 261 is circulated from steam generating complex 202 via super heater 210. Steam exiting high pressure turbine 261 is returned to steam generating complex 202 where it is reheated in furnace 204 in reheater 211 and provided to medium pressure turbine 262 after passing through the reheater. Steam exiting medium pressure turbine 262 is fed from the medium pressure turbine to drive low pressure turbine 263. Steam exiting low pressure turbine 263 is returned to boiler drum 206 via a condenser 212 and a heat exchange coil 214 referred to as an "economizer". Cooling for condenser 212 is provided by a cooling tower 216 and effluents from the burning of coal in furnace 204 is released to the air as smoke 218 through a chimney 220 after passing through a precipitator 221 that removes particulate matter from the effluents.

Operation of power plant 200 and control of equipment in the power plant are mediated by a SCADA system schematically represented by a computer icon 250. Data, hereinafter also referred to as operations status data, relevant to and/or indicative of the functioning of pieces of equipment in power plant 200 and/or a communications network that supports communication to and from the pieces of equipment is acquired by sensors, which may be referred to as "collector agents" directly or indirectly coupled to the equipment. The collector agents transmit the operations status data they acquire to SCADA 250 for processing to monitor and control the equipment and operations of power plant 200. In FIG. 1A collector agents are schematically represented by callout boxes 252 having pointers indicating equipment to which they are respectively coupled.

It is noted that whereas collector agents, such as collector agents 252, are not shown for distribution gird 300, collector agents for monitoring functioning of the distribution grid are generally distributed throughout a distribution grid for acquiring operations status data that indicate status of functioning of components of the grid. For example, collector agents may be used to monitor current loads in and temperatures of transmission cables 302 and input and output voltages of step down transformers. A distribution grid also generally comprises, or has access to a SCADA system, that receives operations status data acquired by the collector agents for the parameters relevant to operation of components of the grid and controls the components responsive to the received data. In the following discussion it is assumed that distribution grid 300 has access to and is controlled by SCADA 250.

Simulation facility 20 optionally comprises a physical model 30 of power station 200 and a physical model 40 of distribution grid 300 in accordance with an embodiment of the invention. Model power station 30 mimics operation of power station 200 and is schematically represented by a reduced image of power plant 200. Similarly, model distribution grid 40 mimics operation of distribution grid 300 and optionally customers 304, hereinafter also referred to collectively as distribution grid 300, and is schematically represented by a reduced image of distribution grid 300 and customers 304.

Model power station 30 comprises physical and, optionally, virtual equipment, collectively indicated In FIG. 1A by numeral 31, that corresponds to physical equipment comprised in power station 200. The model power station 30 also comprises a SCADA system 32 that monitors and controls equipment 31 similarly to the manner in which SCADA 250 controls and monitors equipment in power station 200. Optionally equipment 31 comprises collector agents 33 that correspond to collector agents 252 in power station 200 and acquire and provide to SCADA 32 operations status data relevant to monitoring and controlling functioning of devices in equipment 31. It is noted that whereas model power station 30 is represented by a miniature of power station 200 it does not necessarily comprise physical and/or virtual equipment entities for every piece of equipment comprised in power plant 200 and may model only a portion of power station 200 or a portion of functions performed by power plant 200.

Physical equipment 31 may comprise equipment identical to corresponding equipment comprised in power station 200 as well as physical equipment configured to mimic corresponding equipment comprised in power station 200 that is not identical to the corresponding equipment. Virtual equipment comprises software constructed entities, which may comprise physical equipment configured by the software, that mimic corresponding equipment comprised in power station 200. A given virtual equipment entity corresponding to a given piece of physical equipment in power station 200 operates substantially as if it were the corresponding physical entity. The given virtual equipment entity communicates and cooperates with other real and/or virtual equipment in model 30 similarly to the manner in which the corresponding equipment in power station 200 communicates and cooperates with other equipment in power station 200. The given virtual equipment entity may be accessed via SCADA 32 similarly to the manner in which equipment in power plant 200 may be accessed by SCADA 250.

Similarly to model power station 30, which comprises physical and optionally virtual equipment corresponding to equipment comprised in power station 200, model distribution grid 40 comprises physical and, optionally, virtual equipment, that corresponds to physical equipment comprised in distribution grid 300. And, whereas model distribution grid 40 is represented by a miniature of distribution grid 300 it does not necessarily comprise physical and/or virtual equipment entities for every piece of equipment comprised in distribution grid 300. Model distribution grid may model only a portion of distribution grid 300 or a portion of functions performed by distribution grid 300. Optionally, model distribution grid 40 comprises collection agents (not shown) that correspond to collection agents (not shown) in distribution grid 300 and provide operations status data relevant to operation of components of model distribution grid 40 to SCADA 32.

Simulation facility 20 comprises a centralized or distributed computer or computer system, hereinafter a controller represented by a computer icon 50 optionally for configuring SCADA 32, and updating operation of models 30 and 40 responsive to data received from actual operation of power station 200 and distribution grid 300. In accordance with an embodiment of the invention, data from power station 200 is received via a secure one way communication channel 53 that transmits data from power station 200 and distribution grid 300 but does not transmit data to the power station and/or the distribution grid. Data is transmitted between controller 50 and models 30 and/or 40 via a communication channel or network represented by a double arrow head block arrow 55. In an embodiment of the invention data generated or acquired by controller 50 may be provided for use by power station 200 and/or distribution grid 300 by written documentation or other communication channel considered sufficiently secure against cyber attack. Providing data by written documentation or "sufficiently secure" channel is schematically represented by a dashed block arrow 54.

Simulation facility 20 is configured to provide simulation attack agents 61 and simulation defense agents 62 with access to model power station 30 and/or model distribution grid 40 to participate in a "cyber battle session". In the cyber battle session, simulation attack agents 61 attempt to carry out cyber attacks that damage or impair functioning of power station model 30 and/or distribution grid model 40 and battle with simulation defense agents that operate to defend the attacked model 30 and/or 40 and thwart the attacks.

Controller 50 optionally comprises a memory in which it stores and manages data in a CYBAD data base. Controller 50 operates to acquire and store in CYBAD a forensic record of the cyber battle session that may be processed as discussed below to promulgate cyber shield technologies for protecting power station 200 and/or distribution grid 300 responsive to the cyber battle session. Optionally, controller 50 comprises a model maker module that processes data in the forensic record to provide cyber shield technologies. In an embodiment, the cyber shield technologies comprise a classifier for recognizing and identifying cyber attacks on model 30 and/or model 40.

Providing access for simulation attack agents 61 to model 30 and or model 40 may comprise providing the simulation attack agents with computers, software, and virtual financial resources, hereinafter generically referred to as "attack toolware", of various levels of sophistication for mounting cyber attacks on the model facility. The attack toolware is optionally similar to toolware that might be available to real life attack agents for undertaking a cyber attack on power station 200.

Optionally, attack toolware sophistication is classified as low, medium, or high. Low level sophistication refers to attack toolware generally available to less experienced "real life" criminals, hackers, and hacktivists, typically motivated by personal interest. Attack toolware of medium level sophistication refers to toolware generally available to relatively experienced and skilled hackers, who might for example belong to a criminal group or small terrorist group, that have access to financial resources generally beyond the financial resources available to a single individual. High level sophistication refers to toolware available to nation states and national or international terrorist groups.

Providing simulation defense agents 62 with access to models 30 and 40 may comprise providing the simulation defense agents with computers and software, hereinafter operations and management (O&M) toolware, for accessing SCADA 32, operating and maintaining the model facility, and defending the model facility against cyber attacks mounted by the simulation attack agents 61. The O&M toolware advantageously, at least in part, mirrors O&M toolware employed to operate, monitor, and defend power station 200 and distribution grid 300 against cyber attacks.

In an embodiment of the invention, simulation facility 20 comprises human activity sensors represented by icons 51. Human activity sensors 51 may be used to monitor activity of attack agents 61 and defense agents 62 in battling against each other and interacting with the simulation facility 20 during the cyber battle session and acquire data for the forensic record of the cyber battle session. Controller 50 may store human activity data provided by sensors 51 in CYBAD as part of the forensic record of the cyber battle session.

Sensors 51 may by way of example optionally comprise video cameras that record videos of activity of simulation attack and defense agents during the cyber battle session. Sensors 51 may comprises any of various HMI sensors such as keystroke logging sensors and devices for following use of keyboards by attack and defense simulation agents 61 and 62 to engage and implement software instruction sets in mounting or defending against cyber attacks. Keystroke logging devices known in the art for keystroke logging of simulation agent's keyboard use in accordance with an embodiment of the invention may comprise acoustic and/or electromagnetic keystroke sensors or keystroke tracking programs installed on computers used by agents 61 and 62. Optionally, sensors 51 comprise eye tracking technology to track gaze directions of simulation agents 61 and 62 and determine their points of regard (POR) and movement of the POR between features of computer displays with which the simulate agents interact.

In an embodiment of the invention sensors 51 comprise, any of various wearable and/or non-contact body function sensors for monitoring physiological features of the simulation agents to provide indications for example of levels of concern, stress, and/or alertness during a cyber battle. By way of example, a wearable body function sensor may be a sensor bracelet for sensing heart rate and/or blood pressure. A non-contact sensor may comprise an optical sensor for sensing skin color to infer stress or heart rate or an IR sensor for sensing body temperatures.

In an embodiment of the invention controller 50 monitors collecting agents 33 comprised in equipment 31 either directly or via SCADA 32, to monitor functioning of individual real or virtual pieces of equipment in power station model 30 during the cyber battle and acquire operations status data for the equipment during the cyber battle. The operations status data may be stored as part of the forensic record of the cyber battle in CYBAD.

In an embodiment of the invention, the model maker module comprised in controller 50 processes operations status data in CYBAD to define and determine a time dependent operations status vector for model 30 that represents an operational status of power station module 30 at given times during the cyber battle session. An operations status vector for model 30 may have components that assume at any given time values provided by each of a plurality of collector agents 33 comprised in model 30 at the given time. Optionally an operations status vector comprises data provided by human activity sensors 51 that may for example provide data indicating use and/or status of HMI equipment such as computer keyboards.

Optionally, the model maker module defines at least one classifier responsive to the status vectors for the cyber battle session for determining whether a status vector at a given time during the cyber battle indicates that model 30 is under a cyber attack mounted by simulator attack agents 61. Optionally, the at least one classifier comprises a support vector classifier. In an embodiment of the invention, the at least one classifier comprises a neural network that is trained on operations status vectors stored in CYBAD. Optionally, controller 50 maintains a library of representative operations status vectors, hereinafter referred to as Attack ID feature vectors, that the at least one classifier has determined indicates cyber attacks and may be used to identify particular forms of cyber attacks. In an embodiment of the invention, the at least one classifier and/or Attack ID feature vectors is used to determine if an operations status vector defined by SCADA 250 for power station 200 and/or distribution grid 300 indicates that power station 200 and/or the distribution grid is under cyber attack and optionally to determine a form of the attack.

In an embodiment of the invention, the model maker module processes data in CYBAD to determine which defense strategies undertaken by simulation defense agents 62 against cyber attacks mounted by simulation attack agents 61 are successful in preventing the cyber attacks or mitigating damage they incur. Optionally, the model maker module provides a map and a sequence of procedures performed in a successful defense strategy. In an embodiment of the invention the model maker module defines feature vectors, hereinafter Defense ID feature vectors, for successful defense strategies that label and characterize the defense strategies. Optionally, the model maker model configures defense strategy feature vectors so that scalar (dot) products of Defense ID feature vectors with Attack ID feature vectors may be used to indicate which defense strategies are advantageously performed to thwart a given cyber attack.

In an embodiment of the invention, Defense ID feature vectors are used to determine advantageous defense strategies to be undertaken to defend power station 200 and/or distribution grid 300 against cyber attacks. When an operations status vector for power station 200 and/or distribution grid 300 indicates that the power station and/or grid may be under a cyber attack, scalar products of the operations status vector and Defense ID feature vectors are calculated. A Defense ID feature vector having a largest scalar product with the operations status vector is optionally used to avert or minimize damage from the possible cyber attack.

Human activity data acquired by sensors 51 and stored in CBAD as a part of the forensic record of the cyber battle session may be used to configure environments in which defense agents 62 operate to improve their ability to defend against cyber attacks. For example, data may be used to configure screen displays on computer video screen to improve effectiveness of visual alerts presented on the video screen to alarm the defense agents to a probability of a cyber attack. The human activity data may be used to improve prompts to defense agents for undertaking appropriate activity to thwart a cyber attack. The human activity data may also be used to advantageously configure spatial configuration of defense agents to improve cooperation among defense agents that may be required to join in a common defense task.

It is noted that whereas in the above discussion of embodiments of the invention a cyber simulation facility is discussed as configured for a power station and power grid, practice of the invention is not limited to power stations and power grids. A cyber simulation facility may be configured for use in developing and analyzing cyber attack and/or defense strategies for any of various infrastructure facilities, such as by way of example, water treatment plants, oil distribution systems, and gas pipeline distribution systems.

In the description and claims of the present application, each of the verbs, "comprise" "include" and "have", and conjugates thereof, are used to indicate that the object or objects of the verb are not necessarily a complete listing of components, elements or parts of the subject or subjects of the verb, Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A simulation facility comprising:
an operational model facility of a real infrastructure facility that mimics at least in part operations of the real infrastructure facility and includes non-information-technology equipment that corresponds to and mimics operations of equipment in the real infrastructure facility;
attack toolware for use by a first team of people in mounting cyber attacks on the model facility;
operations and management toolware for use by a second team of people in operating the model facility and in defending the model facility against the cyber attacks mounted by the first team of people using the attack toolware; and
a controller having a memory and operable to acquire, and to store in the memory a forensic record of cyber attacks mounted by the first team of people on the model facility that includes the non-information-technology equipment, and of defense strategies undertaken by the second team of people to defend the model facility against the cyber attacks, wherein the forensic record comprises data indicative of interactions among the second team of people and of physiological features of the second team.

2. The simulation facility according to claim 1, wherein the non-information-technology equipment in the model facility comprises physical equipment that is not connected to the real infrastructure facility.

3. The simulation facility according to claim 1, wherein the non-information-technology equipment in the model facility comprises virtual equipment.

4. The simulation facility according to claim 1, further comprising collector agents not coupled to the real infrastructure facility configured to acquire operations status data relevant to, or indicative of the functioning of the non-information-technology equipment in the model facility.

5. The simulation facility according to claim 4, wherein the controller receives the operations status data and stores the operations status data in the memory as part of the forensic record.

6. The simulation facility according to claim 5, further comprising a model maker module configured to process data in the forensic record to generate operations status vectors that includes components that have values responsive to operations status data provided by each of a plurality of the collector agents.

7. The simulation facility according to claim 6, wherein the model maker module defines at least one classifier responsive to the operations status vectors for determining whether an operations status vector at a given time indicates that the model facility is under a cyber attack, wherein the at least one classifier comprises a neural network.

8. The simulation facility according to claim 1, wherein the data of the forensic record indicative of physiological features of the second team comprises data acquired by at least one sensor configured to acquire data indicative of activity of people in the second team, wherein the at least one sensor comprises at least one of a video camera configured to record videos of activity of people in the facility and a gaze tracker.

9. The simulation facility according to claim 1, wherein the real infrastructure facility comprises at least one of a power station, water treatment plants, oil and gas pipeline distribution systems.

10. The simulation facility according to claim 1, wherein the real infrastructure facility is configured to use the forensic record to defend the real infrastructure facility against cyber attack.

11. The simulation facility according to claim 1, wherein the attack toolware and operations and management toolware are for use by the first team of people and the second team of people in competing against each other, and the forensic record comprises data indicative of a competition between the first team of people and the second team of people.

12. The simulation facility according to claim 1, wherein the attack toolware includes virtual financial resources.

13. The simulation facility according to claim 1, wherein the attack toolware has at least two levels of sophistication, corresponding to different types of real-life attack agents.

14. The simulation facility according to claim 1, wherein the data of the forensic record indicative of physiological features of the second team comprises data acquired by at least one sensor configured to acquire data indicative of activity of people in the second team, wherein the at least one sensor comprises a human machine interface (HMI) sensor.

15. The simulation facility according to claim 1, wherein the data of the forensic record indicative of physiological features of the second team comprises data acquired by at least one sensor configured to acquire data indicative of activity of people in the second team, wherein the at least one sensor comprises a wearable sensor for monitoring physiological features.

16. The simulation facility according to claim 1, wherein the data of the forensic record indicative of physiological features of the second team comprises data acquired by at least one sensor configured to acquire data indicative of activity of people in the second team, wherein the at least one sensor comprises a non-contact sensor for monitoring physiological features.

17. The simulation facility according to claim 15, wherein the controller receives the data acquired by the sensors and stores the received data in the memory as part of the forensic record.

18. The simulation facility according to claim 17, further comprising a model maker module that processes data in the forensic record to generate operations status vectors comprising components that have values responsive to data provided by each of a plurality of the sensors.

19. A method of developing a strategy to defend one of a model facility of a real facility and a real facility against cyber attack, the method comprising:

providing a simulation facility, the simulation facility comprising
  the model facility that mimics at least in part operations of the real facility and includes non-information-technology equipment that corresponds to and mimics operations of equipment in the real facility,
  attack toolware for use by a first team of people in mounting cyber attacks on the model facility,
  operations and management toolware for use by a second team of people in operating the model facility and in defending the model facility against the cyber attacks mounted by the first team of people using the attack toolware, and
  a controller having a memory and operable to acquire and store in the memory, a forensic record of cyber attacks mounted by the first team of people on the model facility that includes the non-information-technology equipment, and of defense strategies undertaken by the second team of people to defend the model facility against the cyber attacks, wherein the forensic record comprises data indicative of interactions among the second team of people and of physiological features of the second team;
the method further comprising
acquiring at the controller the forensic record responsive to people of the first team using the attack toolware to mount cyber attacks on the model facility and people of the second team using the operations and management toolware to defend against cyber attacks on the model facility and to maintain the operation of the simulation facility; and
processing by the controller data in the forensic record to generate a defense strategy for use of people to defend the one of the model facility and the real facility against cyber attacks.

20. The method of claim 19, wherein the generating of the defense strategies comprises using the data indicative of interactions among the second team of people and of physiological features of the second team to configure environments which improve people s ability to defend against cyber attacks.

* * * * *

UNITED STATES PATENT AND TRADEMARK OFFICE
CERTIFICATE OF CORRECTION

PATENT NO.       : 10,382,474 B2
APPLICATION NO.  : 15/033875
DATED            : August 13, 2019
INVENTOR(S)      : Ofir Hason Page 1 of 1

It is certified that error appears in the above-identified patent and that said Letters Patent is hereby corrected as shown below:

On the Title Page

Item (73) should read:
CYBERGYM CONTROL LTD.

Signed and Sealed this
First Day of October, 2019

Andrei Iancu
*Director of the United States Patent and Trademark Office*